ив
3,202,547
ELECTROCHEMICAL REACTION APPARATUS
Robert A. Rightmire, Twinsburg, Philip S. Fay, Cleveland, Ohio, and Melvin J. Mazurowski, Buffalo, N.Y., assignors to The Standard Oil Company, Cleveland, Ohio, a corporation of Ohio
Filed Aug. 4, 1961, Ser. No. 129,423
8 Claims. (Cl. 136—86)

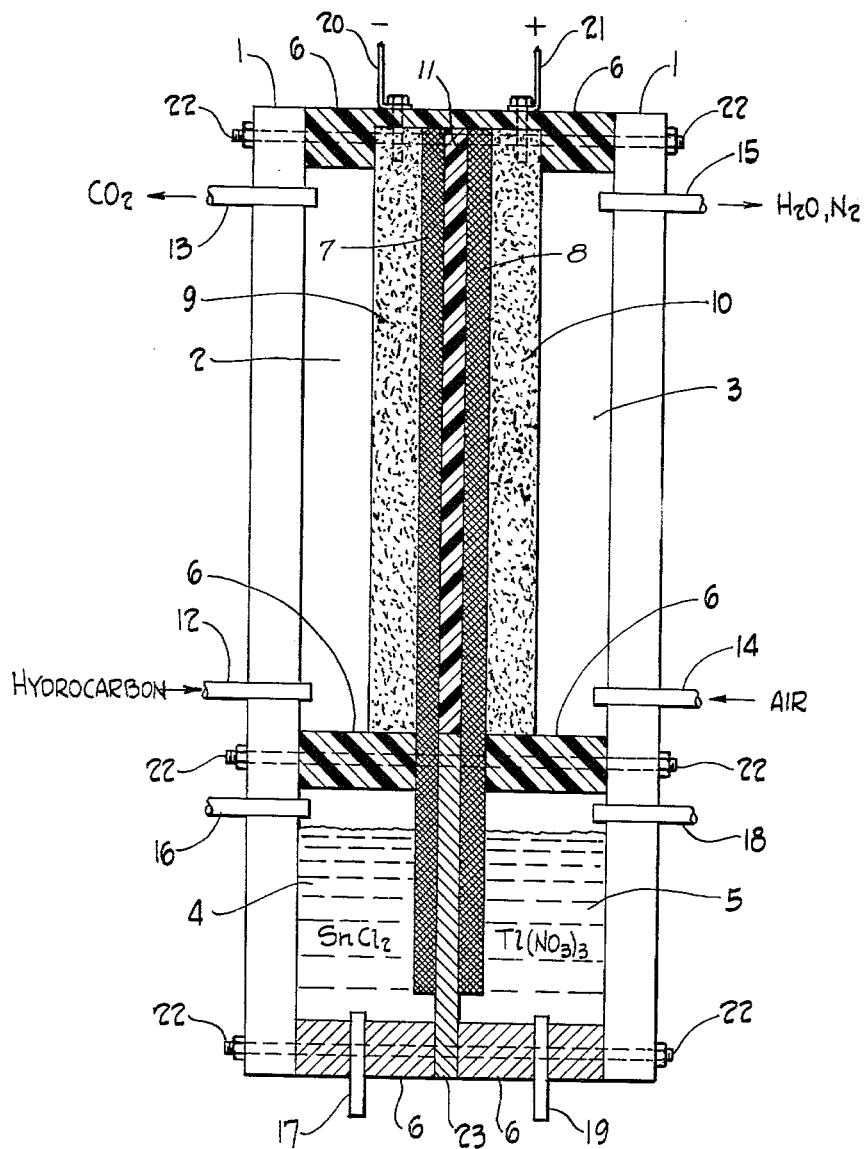

This invention relates generally to the useful conversion of one form of energy to another, and particularly relates to an improved apparatus and method for accomplishing such conversion electrochemically. More particularly, this invention relates to an improved apparatus characterized by novel means for maintaining a substantially constant relationship with respect to certain active chemical components, and for enhancing the electrochemical conversion of the energy of chemical combinations into useful electrical energy. This invention will, for exemplary purposes, be described with reference to a fuel cell, it being understood, however, that these principles are applicable to other types of electrochemical reaction apparatus as well.

The direct conversion of chemical energy into electrical energy is accomplished by causing chemical reactions to take place between reactive materials at the junctures between spaced electron conductors, which themselves may be such reactive materials, and an intermediate ion transfer medium to form a continuous energy exchange system. The reactive materials are separately supplied to each juncture so that the charge exchange of the reaction takes place ionically through the ion transfer medium forming an internal circuit and electronically through the electron conductor forming an external circuit. Thus, where the reactive materials are continuously supplied and an electrical load coupled to the external circuit, it is possible to electrochemically convert the energy of chemical reaction directly into electrical energy in the external circuit.

By way of example, where hydrogen is employed as one of the materials and oxygen as the other, the oxidation and reduction of these materials at the corresponding junctures between the electronic and ionic conductors generates electrical energy in the external circuit and produces water as a product of the reaction. When each of the materials is continuously supplied and consumed within such as apparatus, it may be likened, respectively, to a fuel, and to an antifuel, the former of which is selected to yield electrons in its chemical reaction and the latter of which is selected to accept electrons.

Normally, in any such apparatus, the fuel and antifuel are supplied in a relatively stable condition and some means is required for activating their conversion from their normally stable reactant state to the reaction product state. It is believed that such conversion of the fuel and antifuel takes place by means of chemical adsorption to a chemisorbed state and desorption to their reaction product state at the corresponding junctures between the electron and ion conductors. Such conversion of the fuel and antifuel is not practically self-motivating, and is, therefore, preferably activated by the introduction of some means which will promote adsorption at each juncture and some ionic means in the ion-transfer medium which will promote desorption at each juncture. The reaction products may be removed from the apparatus in any convenient manner and preferably as they are formed.

For purposes of this description, the apparatus for accomplishing the direct conversion of chemical energy to electrical energy will be identified as a fuel cell. The electron conductors will be identified as electrodes and more specifically as the anode and cathode, respectively, depending upon whether they are on the fuel or antifuel side of the cell. The fuel will be identified throughout as any substance which is oxidizable relative to the antifuel, which will in turn be identified as any substance which is reducible relative to the fuel; where oxidation and reduction, respectively, contemplate the release and acceptance of electrons.

A medium which is capable of conducting an electrical charge associated with an atom or a group of atoms, i.e. ions, will be referred to as an ion conducting medium or ion transfer medium. The ion conducting medium serves to isolate the electronic conductors from each other in the internal circuit. The junctures between the electrodes and the ion transfer medium will be identified throughout as reactive interfaces. The activating means for promoting the conversion of the fuel and the antifuel from the reactant state through the chemisorbed state to the reaction product state will be more specifically identified in conjunction with their functional coaction in the cell as an adsorber and a desorber. The ions contained in the ion-containing and conducting medium usually activate desorption while adsorption is usually promoted by an activator coacting with or as the electrode. The overall reaction will be referred to as an electrochemical reaction.

The ion transfer medium may be a single ion-containing and conducting medium, or it may comprise a pair of ion-containing and conducting media which are separated by a barrier which coacts between the two media to transfer ions from one to the other while preventing physical admixture of the respective media. The barrier may thus be of the ion-permeable type, for example, an ion exchange resin, or the barrier may be of the ion impermeable type, such as a hydrogen bridge type, wherein the charge is separated from the ion, the ion constituted as an atom or compound, the charge and the compound or atom transferred to the opposite side of the cell across the barrier and reconstituted as an ion at the barrier-medium interface. An example of such an ion impermeable barrier is a thin palladium foil. Palladium is permeable to hydrogen atoms and also serves as a conductor for the electrical charge associated therewith.

Briefly, in accordance with this invention and the preferred application of the principles encompassed thereby, there is provided an electrochemical reaction apparatus, preferably in the form of a fuel cell, having spaced electron conducting members, and an ion transfer medium coacting therebetween and defining reaction interfaces with each of said electron conducting members. The ion transfer medium includes at least one ion-containing and conducting medium. Capillary means are provided for supplying ion-containing and conducting medium to each of the reaction interfaces, which capillary means coact with a reservoir containing the ion-containing and conducting medium in solution. This invention further contemplates the provision of means to maintain the concentration of ions in the ion-containing and conducting medium, or media as the case may be, at a substantially constant level.

In the annexed drawings:

The figure is a cross-sectional view of one form of apparatus embodying the principles of the present invention.

With more particular reference to the figure, there is shown one form of fuel cell illustrative of the present invention. Although a single unit cell is shown in the illustration, it should be understood that multiple assemblies of such unit cells, arranged according to many possible variations for stacking may be produced to supply various demands for electrical output.

In the structure shown in the figure, end plates 1 form the etxerior walls of the fuel chamber 2, and the antifuel chamber 3, respectively, and the external walls of the reservoir 4 on the fuel side and the reservoir 5 on the antifuel side. These end plates 1 may be fabricated of metal, impervious graphite, glass, ceramic of plastic materials. The particular material of construction is chosen so that it is not reactive chemically with the fuel, antifuel or ion-containing and conducting media under the conditions of operation of the apparatus. In the event that electrically conducting materials are selected, suitable electrical insulating gaskets must be provided to isolate the electrodes from the other cell components. Front and rear plates, together with the marginal frames 6 complete the exterior housing of the cell of the figure.

The marginal frames 6 serve to maintain the various components of the fuel cell in the correct spatial arrangement, form a portion of the external cell body or housing, and marginally enclose fuel chamber 2, antifuel chamber 3, and reservoirs 4 and 5. The frames 6 also provide a barrier between the fuel chamber 2 and the reservoir 4 on the fuel side, and the antifuel chamber 3 and its reservoir 5 on the antifuel side. Impermeable divider 23 partitions reservoir 4 from reservoir 5. The frames 6 may be fabricated of metal, impervious graphite, glass, ceramic or plastic materials. Since the frames 6 are in contact with different materials and different areas of the fuel cell as shown in the figure, it may be found desirable that the various frames 6 be fabricated from several different materials. However, those in contact with the active electrodes should be provided with suitable electrically insulating gaskets if they themselves are electrically conducting, and those in contact with the fuel, antifuel, and the ion-containing and conducting media should be chemically resistant to these respective agents under the operating conditions of the fuel cell.

The fuel electrode 9 and the antifuel electrode 10 may each be fabricated from porous carbon. If desired, the porous carbon may have deposited in the pores thereof a suitable activator for adsorption such as a metal e.g. platinum, palladium, nickel, or the like. Additionally, the electrodes may be treated with water-proofing agents such as a dilute benzene solution of wax (5% concentration), followed by removal of the solvent. Additionally, the electrodes may be formed from porous sintered metals such as porous nickel. The marginal edges of the electrodes may be sealed, as with wax or plastic, to prevent escape of material therethrough.

Disposed between the fuel electrode 9 and the antifuel electrode 10 is a space adapted to contain an ion transfer medium which electronically insulates the fuel electrode 9 and the antifuel electrode 10 from each other, but permits the transfer of electrical current by means of ions. In the embodiment shown in the figure, the ion transfer medium is composed of a pair of chemically incompatible aqueous solutions separated by a barrier 11 which in the embodiments shown is conveniently an ion exchange resin. The barrier 11 is disposed between and spaced from each of the fuel electrode 9 and antifuel electrode 10. Disposed within the spaces thus defined is a porous absorbent member 7 and a similar porous absorbent member 8. The porous absorbent member 7 is also in contact with reservoir 4, which in the illustration shown in the figure contains a saturated aqueous solution of stannous chloride. The porous absorbent member 8 is similarly disposed and in contact with the reservoir 5 which in the illustration shown contains a saturated aqueous solution of thallium nitrate. These absorbent members 7 and 8 may be made of any suitable material capable of conducting a solution from the reservoirs 4 and 5, respectively, in whole or in part by capillary forces, such as a cotton wicking material, absorbent paper web, porous ceramic, porous alumina, etc. Positive pressure applied to the reservoirs may be used to aid the capillary forces. The temperature will control to some extent the nature of the material which is used for supplying the ion-containing and conducting medium to the interface between the ion-transfer medium and the respective electrodes 9 and 10. For slightly higher temperature ranges, asbestos felting material may also be used.

The interposed barrier 11 may, as indicated above, be made of a resinous material or any other material which will allow the easy passage of hydrogen ions derived from the fuel over to the antifuel side of the cell, or the easy passage of hydroxyl ions derived from the antifuel to the fuel side of the cell. Typical examples of ion exchange resins of the type which may be used in accordance with the present invention are the following:

The first is a "polyethylene membrane" available as "Amberplex C–1" cation exchange membrane. Such material may be prepared by first polymerizing a mixture of about 95 parts by weight of styrene and about 5 parts by weight of divinyl benzene. The resulting polymer is comminuted to fine particles and 100 parts by weight of this finely divided material sulphonated by reaction of about 175 parts by weight of chlorosulphonic acid. This reaction is carried out by heating the mixture at reflux temperature for about 3 minutes and maintaining the mixture at room temperature for an additional 50 hours. The sulphonated product is then treated with a large excess of water to destroy the excess of chlorosulphonic acid and any acid chlorides which are formed. This results in a sulphonated resin containing 3.1 milliequivalents of mobile hydrogen ions per gram of resin. After drying this sulphonated resin, 2 parts by weight of the dried resin are mixed with 1 part by weight of polyethylene and the resulting mixture pressed into sheet or membrane form. The resulting polyethylene membrane contains 2.1 milliequivalents of mobile hydrogen ions per gram of dry membrane. When the dried membrane is soaked in water, the resulting water solvated product contains about 45% by weight of water.

Another example of a resin may be prepared in accordance with the following:

| | Parts |
|---|---|
| Sulphuric acid (95.5%) | 141 |
| Phenol | 115 |
| Formaldehyde (37% in water) | 180 |

The sulphuric acid was added to the phenol at 95° C. and the mixture heated to 140° C. for two hours and cooled to room temperature. The formaldehyde was cooled to zero degrees C. and the mixture of phenol and sulphuric acid added. Additional cooling was provided to keep the temperature of the mixture below 20° C. The temperature was then reduced to 5° C., at which temperature the mixture may be stored for weeks without polymerization. The mixture is of viscous oily liquid reddish-amber color. This mixture may be heat polymerized by heating to a temperature of about 50° C. until the material is solid and dark in color. The solid material may be shaped to any desired shape such as by casting the liquid into a suitable form, solidifying and cutting off sections of desired thickness.

The fuel chamber 2 is provided with an inlet port 12 to allow the introduction of the fuel which may be hydrogen, hydrocarbon, alcohol, etc., into the fuel cell, and is also provided with an outlet port 13 to allow for the exhausting of products of the electrochemical reactions occurring on the fuel side of the cell. Similarly, the antifuel chamber 3 is provided with an inlet port 14 to permit the introduction of an antifuel, such as air, oxygen, etc. into the fuel cell, and is also provided with an outlet port 15 to allow for the exhausting of products of the electrochemical reaction occurring on the antifuel side of the cell.

The reservoir 4 on the fuel side of the cell is equipped with an inlet tube 16 and a drain 17 by means of which supply and concentration of the ion-containing and conducting medium for the fuel side of the cell may be adjusted during the operation thereof. Similarly, the antifuel side reservoir 5 is equipped with an inlet tube 18 and a drain 19 by means of which the supply and concentration of the antifuel side ion-containing and conducting medium may be adjusted during the operation of the cell. The electrical output of the cell is tapped off by means of the conductors 20 and 21 attached directly to the electrodes 9 and 10, respectively, and the whole fuel cell assembly is held together by longitudinal bolts 22 passing through channels in the end plates and strip spacers.

The ion-containing and conducting medium associated with the fuel side of the cell is conveniently a saturated solution of stannous chloride. One means of maintaining the concentration of stannous chloride is to provide an excess of solid phase stannous chloride deposited in the bottom of the reservoir 4. Likewise with respect to the ion-containing and conducting medium associated with the antifuel side of the cell contained in reservoir 5, it is convenient to maintain the concentration of this at a substantially constant level by employing a saturated solution of thallium nitrate and an excess of solid phase crystals of thallium nitrate exposed in the bottom of the reservoir. When the formation of by-product water of the electrochemical reaction takes place on the antifuel side of the cell, there will be a tendency to dilute the thallium nitrate solution. Because of the differences in concentration and diffusive effects, thallium nitrate will continuously be dissolved into the solution from the supply of solid phase thallium nitrate thus tending to maintain the concentration of the ion-containing and conducting medium in this side of the cell substantially constant. There may be a tendency on the fuel side of the cell, on the contrary, for a depletion of water from this side and consequently, solid stannous chloride may continuously crystallize from the ion-containing and conducing medium forming more of the solid phase. This however serves to maintain the concentration of the ion-containing and conducting medium substantially the same.

Stannous chloride has been selected as the ion providing salt in the ion-containing and conducting medium for the fuel side for the reason that the tin ion in a saturated aqueous solution of stannous chloride activates the desorption of hydrogen from the fuel electrode with great efficiency for the reason that the oxidation-reduction potential of the stannous ion and changing from stannous to stannic is substantially the same as the oxidation-reduction potential of hydrogen derived from a hydrocarbon, for example, propane. Likewise, on the antifuel side, the thallium ion serves as a desorption activator for oxygen in the form of hydroxyl ion and enhances the electrochemical reaction occurring at the interface between the antifuel electrode 10 and the ion transfer medium. Such enhancement is attributable to the fact that the oxidation-reduction potential of thallium in going from thallous to thallic, i.e. 1.23 volts, substantially matches the standard electrode potential or oxidation-reduction potential of oxygen on the antifuel electrode. Moreover, inasmuch as the valence states of both tin and thallium are in excess of the valence states of the fuel and antifuel, respectively, this factor also tends to promote the electrochemical reaction occurring at the respective electrode interfaces.

In operation, the reservoir 4 is charged with a saturated solution of stannous chloride by means of the inlet tube 16, the drain 17 being normally closed unless the ion-containing and conducting medium in the reservoir 4 is being replaced after a long period of operation. In like manner the ion-containing and conducting medium associated with the antifuel side is disclosed in reservoir 5 as a saturated solution of thallic nitrate by means of inlet tube 18, the drain 19 being normally closed unless the saturated solution is being replaced after a long period of operation.

The ion-containing and conducting medium from the reservoir 4 saturates the absorbent member 7, in this specific example, a porous filter paper mat, and is drawn up by capillarity to contact the surface of the porous carbon fuel electrode 9. This fuel activator solution coacts at the surface of the carbon electrode by enhancing the desorption of hydrogen ions from the surface of the electrode as solution ions causing the rapid release of electrons to the electrode and hence to the external circuit. Hydrocarbon fuel, in the particular example, propane is introduced into the fuel chamber 2 by means of the inlet port 12 and penetrates through the porous carbon fuel electrode 9, becoming adsorbed at the electrode surface and undergoing reaction to form carbon dioxide and hydrogen. The hydrogen becomes adsorbed to the electrode surface and spontaneously enters the chemisorbed state. Through the influence of the activator ions in the ion-containing and conducting medium, hydrogen is removed from the chemisorbed state by a process which we call desorption as a hydrogen ion in the ion-containing and conducting medium. Through the influence of the concentration effect, the hydrogen ions are literally pushed toward the ion exchange barrier 11, and because of the cation exchange characteristics thereof, is able to permeate the ion-exchange resin and enter the antifuel side of the cell.

Simultaneously, carbon dioxide escapes from the porous carbon electrode 9 into the fuel chamber 2 and is exhausted from the fuel cell by means of the outlet port 13.

On the antifuel side of the cell, the saturated thallic nitrate solution saturates the absorbent carrier 8, and the specific example a porous filter paper mat, and is drawn up by capillarity to contact the surface of the porous carbon antifuel electrode 10. Antifuel, in the specific example air, is introduced into the antifuel chamber 3 by means of the inlet port 14 and penetrates the porous carbon antifuel electrode 10. Under the influence of the aqueous medium, the electrode surface, and the ions contained in the medium, the antifuel electrochemically reacts to form hydroxyl ions in solution. The hydroxyl ions thus desorbed from the surface of the antifuel electrode 10 meet and react with the hydrogen ions which have been transmitted through the ion-permeable membrane. Some water and the unreacted nitrogen from the air are exhausted from the fuel cell by means of the outlet port 15. Under the influence of the activator ions, i.e. the thallium ions, the hydroxyl ions are formed, thereby extracting electrons from the electrode and thus completing the electron circuit through the external circuit and back through the ion transfer medium. Because of the increase in the amount of water in the ion-containing and conducting medium on the antifuel side, it is convenient to have solid thallium nitrate disposed in the bottom of the reservoir 5 so that the concentration of the ion-containing and conducting medium is maintained substantially the same, i.e. at saturation. The water balance on the antifuel side of the cell may also be conveniently regulated by adjusting the amount of air circulating through the antifuel chamber 3, utilizing an excess of the amount required to carry out the antifuel electrochemical reaction.

With the fuel cell constructed as shown in FIG. 1 and operated in the manner set forth above, there may be obtained a maximum current density of 15 amperes per square foot, a maximum open circuit voltage of 0.91 volt, a maximum power density of 5 watts per square foot assuming 40% thermal efficiency, and a maximum power per cubic foot of stacked cells of 1 horsepower per cubic foot.

Instead of an ion exchange resin barrier 11, there may be used instead a thin palladium foil or, alternatively, a reticulated porous physically solid structure having a thin metal film deposited within the pores from a chemical solution reduced to the metal by means of heat and hydrogen. A barrier so formed serves to prevent the intermixing of the chemical solutions when the ion transfer medium is composed of a pair of chemically incompatible ion-containing and conducting media. In the case of a thin palladium foil, palladium has the property of passing hydrogen atoms therethrough. The action of the cell is substantially the same except the palladium foil serves as a "hydrogen bridge" in that the hydrogen ions contacting the palladium foil accept an electron from the surface exposed to the fuel side of the cell, become neutralized, and under the influence of the concentration of hydrogen ions are forced through the palladium foil. On the opposite side of the palladium foil, i.e. the antifuel side of the cell, the hydrogen releases an electron to the surface of the palladium foil and becomes reconstituted as a hydrogen ion. Thus the carrier material, in this case, hydrogen, is separated from its charge by the hydrogen bridge, passes through as an atom, while the electrical charge is passed electronically through the barrier. In like manner, porous metallized barrier serves to transmit hydrogen in atomic form while the charge associated therewith is carried electronically. The pore size of the barrier is such that the larger ions of tin, thallium, preferably the common ion chlorine, or nitrate are not able to pass readily through the barrier. Thus, intermingling of the ion-containing and conducting media is minimized.

The chemical incompatibility to which we refer herein relates to the fact that while these ion-containing and conducting medium may not interact chemically, they are incompatible from an electrochemical standpoint.

There has thus been provided an improved electrochemical reaction apparatus having a means for maintaining ion-containing and conducting medium in continuous contact with an electrochemically reactive interface between the electrode and the ion-containing and conducting medium. This means is in the form of a capillary means which continuously feeds the ion-containing and conducting medium to the reaction interface. Also, means are provided for maintaining the concentration of the ion-containing and conducting medium substantially the same so that the amount of activator ion remains substantially constant during the activity of the cell. One of the major difficulties which is overcome by the apparatus of the present invention is that electrode flooding is controlled without the necessity of employing expensive means for overcoming this problem. Excesses of ion-containing and conducting medium are avoided and contained within the proper relationship with respect to both concentration and disposition within the cell. Simpler electrodes may accordingly be employed.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. In an electrochemical reaction apparatus:
   (a) housing means including;
   (b) a fuel chamber;
   (c) an antifuel chamber;
   (d) barrier means for isolating said fuel chamber from said antifuel chamber;
   (e) an electron conductor operably supported within said housing means and communicating with the fuel chamber;
   (f) a second electron conductor spaced from said first electron conductor and operably supported within said housing means and communicating with said antifuel chamber, said second electron conductor being disposed in confronting relation to said first electron conductor;
   (g) a liquid-impermeable ion-exchange membrane isolating said electron conductors from one another;
   (h) reservoir means spaced from said electron conductors and adapted to contain liquid ion-containing and conducting medium;
   (i) capillary means operably connected between said reservoir means and said electron conductors to provide a reaction interface between the ion-containing and conducting medium and each of said electron conductors, said liquid-impermeable, ion-exchange membrane being effective to isolate said interfaces;
   (j) means for supplying fuel and antifuel respectively to said isolated fuel and antifuel chambers; and
   (k) means for exhausting products of electrochemical reaction away from said electron conductors.

2. An electrochemical reaction apparatus in accordance in claim 1 in which said capillary means is a water absorbent web.

3. In an electrochemical reaction apparatus:
   (a) housing means including;
   (b) a fuel chamber;
   (c) an antifuel chamber;
   (d) barrier means for isolating said fuel chamber from said antifuel chamber;
   (e) an electron conductor operably supported within said housing means and communicating with the fuel chamber;
   (f) a second electron conductor spaced from said first electron conductor and operably supported within said housing means and communicating with said antifuel chamber, said second electron conductor being disposed in confronting relation to said first electron conductor;
   (g) reservoir means spaced from said electron conductors and adapted to contain liquid ion-containing and conducting medium, to be moved into contact with said electron conductors and define a reaction interface with each of said electron conductors;
   (h) capillary means coacting with said ion-containing and conducting medium for supplying said medium to each of said reaction interfaces;
   (i) means in said medium for maintaining the concentration of ions in said medium substantially constant during the operation of said apparatus when by-products tend to reduce the ion concentration in said medium;
   (j) means for supplying fuel and antifuel respectively to said fuel and antifuel chambers; and
   (k) means for exhausting products of electrochemical reaction away from said electron conductors.

4. The invention of claim 3 wherein the means for maintaining the concentration of ions in said ion-containing and conducting medium substantially constant, comprises a saturated aqueous solution of an ion in contact with a solid phase salt having a group common to said ion.

5. In an electrochemical reaction apparatus:
   (a) housing means including;
   (b) a fuel chamber;
   (c) an antifuel chamber;
   (d) barrier means for isolating said fuel chamber from said antifuel chamber;
   (e) an electron conductor operably supported within said housing means and communicating with the fuel chamber;
   (f) a second electron conductor spaced from said first electron conductor and operably supported within said housing means and communicating with said antifuel chamber, said second electron conductor being disposed in confronting relation to said first electron conductor;
   (g) reservoir means spaced from said electron conductors and adapted to contain physically isolated first and second liquid ion-containing and conducting media;
   (h) first and second capillary means respectively connected between said reservoir means and said electron conductors to supply said first and second liquid ion-containing and conducting media separately to said electron conductors and provide a reaction interface between an ion-containing and conducting medium and an electron conductor;

(i) ion-permeable means supported to isolate said first and second capillary means from one another against intermingling of ion-containing and conducting media carried thereby, but conduct ions therebetween;

(j) means for supplying fuel and antifuel respectively to said fuel and antifuel chambers, respectively; and (k) means for exhausting products of electrochemical reaction away from said electron conductors.

6. In an electrochemical reaction apparatus:
(a) housing means including;
(b) a fuel chamber;
(c) an antifuel chamber;
(d) barrier means for isolating said fuel chamber from said antifuel chamber;
(e) an electron conductor operably supported within said housing means and communicating with the fuel chamber;
(f) a second electron conductor spaced from said first electron conductor and operably supported within said housing means and communicating with said antifuel chamber, said second electron conductor being disposed in confronting relation to said first electron conductor;
(g) reservoir means spaced from said electron conductors and adapted to contain physically isolated first and second liquid ion-containing and conducting media;
(h) first and second capillary means connected between said reservoir means and said electron conductors to supply said first and second liquid ion-containing and conducting media separately to said electron conductors and provide a reaction interface between an ion-containing and conducting medium and an electron conductor;
(i) means for supply fuel and antifuel respectively to said fuel chamber and antifuel chamber, respectively;
(j) means for exhausting products of electrochemical reaction away from said electron conductors; and
(k) an electrically conducting metal barrier between said electron conductors to prevent transfer of ion-containing and conducting media between said electron conductors, said barrier being permeable to hydrogen ions.

7. The invention of claim 6 in which the barrier means is palladium foil.

8. In a fuel cell for the production of electrical energy by electrochemical interaction of a fuel and an antifuel:
(a) a fuel chamber including as a wall thereof;
(b) a porous fuel electrode;
(c) an isolated antifuel chamber including as a wall thereof;
(d) a porous antifuel electrode;
(e) means supporting said electrodes in confronting relation to each other with a space therebetween;
(f) an ion-permeable membrane disposed between said electrodes in said space and defining solution-retaining chambers adjacent to each of said electrodes;
(g) a reservoir containing aqueous tin chloride;
(h) capillary wicking means in the chamber of said fuel electrode and communicating with said reservoir containing aqueous tin chloride solution;
(i) a separate reservoir containing aqueous thallium chloride;
(j) capillary wicking means in the chamber of said antifuel electrode and communicating with said reservoir containing aqueous thallium chloride;
(k) barrier means for separating said reservoirs from each other;
(l) means for feeding a fuel to said fuel chamber for contact with said fuel electrodes;
(m) means for feeding an antifuel to said antifuel chamber for contact with said antifuel electrode; and
(n) means for exhausting products of electrochemical reaction from said cell.

References Cited by the Examiner

UNITED STATES PATENTS

| | | | |
|---|---|---|---|
| 1,740,659 | 12/29 | MacDonald | 204—260 |
| 2,700,063 | 1/55 | Manecke | 136—153 |
| 2,702,272 | 2/55 | Kasper | 136—153 |
| 2,901,522 | 8/59 | Bopp | 136—86 |
| 2,913,511 | 11/59 | Grubb | 136—86 |
| 3,005,943 | 10/61 | Jaffe | 136—86 |
| 3,117,034 | 1/64 | Tirrell | 136—86 |

FOREIGN PATENTS 525,374   8/40   Great Britain.

WINSTON A. DOUGLAS, *Primary Examiner.*

JOHN R. SPECK, JOHN H. MACK, *Examiners.*